July 15, 1952     P. J. WALSH     2,603,771

MAGNETIC TRIGGER SYSTEM

Filed Nov. 1, 1948

INVENTOR.
Philip J. Walsh,

Patented July 15, 1952

2,603,771

UNITED STATES PATENT OFFICE 2,603,771

MAGNETIC TRIGGER SYSTEM

Philip J. Walsh, San Francisco, Calif.

Application November 1, 1948, Serial No. 57,760

4 Claims. (Cl. 323—48)

This invention relates to a magnetic trigger system having no moving parts.

It is an object of my invention to provide a trigger system requiring no electron emission devices.

It is another object of my invention to provide a transformer whose output power value and input power value changes abruptly from full load to substantially zero when slightly overloaded, and changes back abruptly to full load output and input when this overload is removed.

It is still another object of my invention to provide a transformer having a control circuit in which a small change in the value of the alternating current flowing therein causes the input and output power value to change abruptly between full load and a small value.

My invention possesses many other advantages and has other objects which may be made more easily apparent from a consideration of one embodiment of my invention. For this purpose, I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings.

Figure 1:
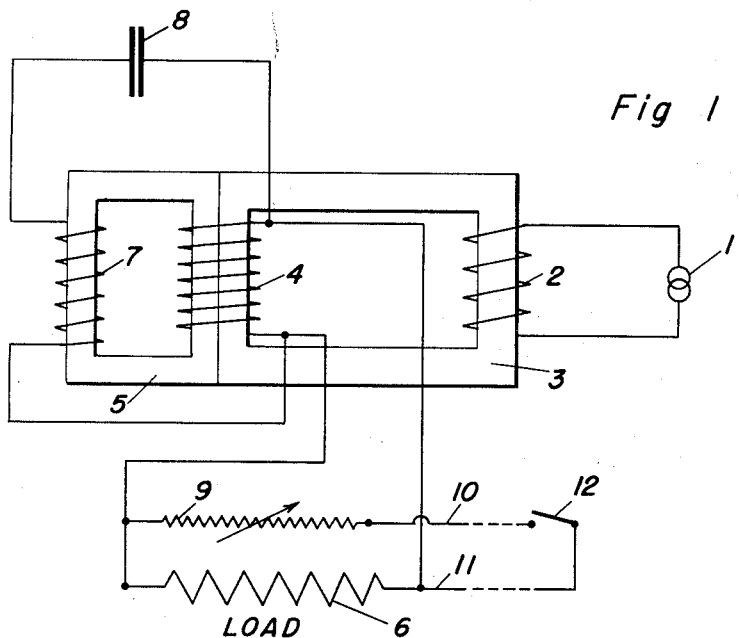
Figure 1 is a system diagram depicting one form of my invention.

In Figure 1 I show a source of alternating current power 1 connected to winding 2 wound on the laminated iron core 3. When current from source 1 flows through winding 2 a magnetic flux is set up in core 3. This flux causes an electromotive force to be induced in winding 4 wound around the legs of the laminated iron cores 3 and 5, which in turn causes current to flow through the load 6 and winding 4. When induced current flows through coil 4 it flows in such a direction as to develop a magnetomotive force that is opposed to that developed by current flowing through coil 2. Thus some of the flux set up by the current flowing in winding 2 is forced over through the other leg of core 5 upon which winding 7 is wound.

This flux induces an electromotive force in coil 7 that tends to cause current flow through the circuit comprising coil 4, coil 7 and condenser 8 in one direction, while the electromotive force induced in coil 4 tends to cause current to flow in this circuit in the opposite direction. But the current flowing through coil 4 sets up flux in core 5 that assists the flux from core 3 to develop the electromotive force in coil 7 while the current flowing through coil 7 tends to develop flux in the opposite direction in core 5 and induce an electromotive force in coil 4 that is opposed to that induced therein by current flowing through coil 2 from source 1.

When condenser 8 discharges through coils 4 and 7, this current flows through one of the coils in one direction and through the other coil in the opposite direction so that the coils assist each other to set up flux in core 5.

Of course all of the energy stored in the flywheel circuit comprising coils 4 and 7 and condenser 8 comes from source 1 by transformer action through core 3, and the current surging between the condenser 8 and the coils 4 and 7 shifts the magnetic permeability of the cores and determines which one of the coils 4 or 7 at any instant during the cycle is acting as the driver. The bucking effect between the coils 4 and 7 determines the amount of energy that can be stored in the flywheel circuit.

In an actual test of the system, winding 2 contained 200 turns, winding 4 contained 400 turns and winding 7 contained 275 turns. Condenser 8 had a value of 15 microfarads. An alternating current 60 cycle source 1 was arranged so that its voltage could be varied in small steps between zero and 50 volts. The curves shown in Figure 2 were plotted by taking voltmeter readings across the coils 2, 4 and 7 and condenser 8.

Figure 2:
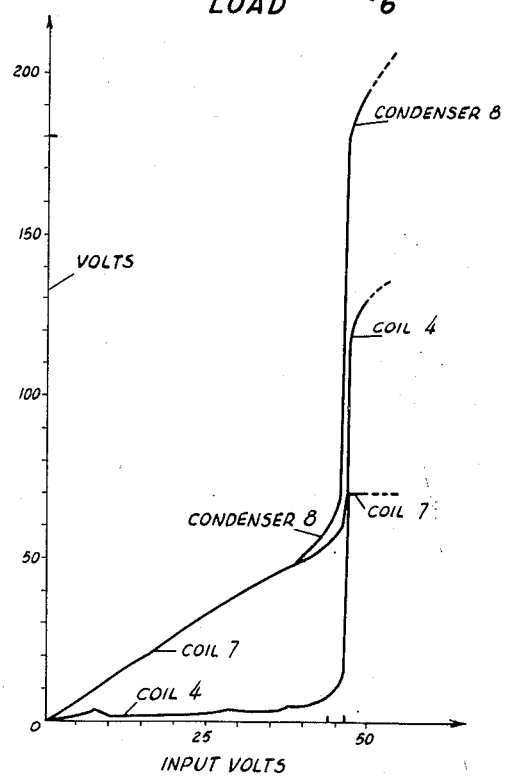
Figure 2 is a drawing for facilitating explanation of the invention.

In Figure 2 it is seen that as the input voltage applied to coil 2 is increased from zero up to 45 volts, the voltage across the large coil 4 as shown by the curve labeled coil 4 increased from zero to only 10 volts, while the voltage across coil 7 increased from zero to 55 volts, and the voltage across condenser 8 increased from zero to 62 volts. It is to be noted that coil 4 which contains twice as many turns as coil 2 has the lowest voltage across its terminals. As the input voltage applied to coil 2 is further increased an abrupt change occurs at 46 volts, and the values jump simultaneously to new high values. The voltage across coil 4 jumps from about 15 volts to 115 volts, that across coil 7 jumps from 57 volts to 70 volts and that across condenser 8 jumps from 62 volts to 180 volts. Reducing the input voltage applied to coil 2 to 44 volts causes another abrupt change and all of the values drop back to the values shown for 44 volts.

The load 6 employed in this test was a 100 watt 120 volt lamp. From the curves it is seen that by varying the input voltage two volts, the voltage across the lamp changes from 10 volts to 120 volts. That is a two volt increment or decrement of supply voltage turns the lamp "on" or "off." These jump and break points can be shifted to meet any given conditions as described in my application for Negative Impedance, Serial No. 42,079, filed August 2, 1948, now abandoned.

A high impedance or resistor 9 can be connected across the load 6 through the switch 12 by means of the wires 10 and 11, which can be of any length as indicated by the dotted lines. In the aforementioned test, the resistor 9 was a 60 watt 120 volt lamp and it was found that on closing switch 12, the voltage across the load 9 instantly changed from a value of 120 volts to a value of 10 volts and that the power absorbed in resistor 9 was one watt. When the switch 12 was opened, the voltage across the load jumped from a value of 10 volts to a value of 120 volts. Closing switch 12 and varying resistor 9 has the same effect. Also a wattmeter connected in the input circuit to coil 2 indicated that the input power drops from full load to a small value when switch 12 is closed. The same result is obtained when the load is short circuited.

Since a change in resistance or a change in the value of a small current flowing in the control circuit can cause very large changes in the output voltage or power, the system is very useful and it is apparent that it has many industrial applications.

For example, if the load 6 is made the heating element of a furnace, and the high resistor 9 is a carbon filament or rod, or made of any other material having a temperature characteristic such that its electrical resistance decreases with an increase in temperature, the system will automatically maintain a controlled furnace temperature. Because as the temperature of the furnace rises to a predetermined value, the resistance of the resistor 9 is reduced enough to cause the voltage across the load to drop to a low value, after which the temperature of the resistor 9 falls and causes the voltage across the load 6 to jump back to its original value. In this way the system acts as a transformer, an automatic switch having no contactors or moving parts, and as a thermostat.

I claim:

1. An electromagnetic trigger circuit comprising a ferromagnetic core having a pair of outer legs and an intermediate leg, a primary winding on one of said outer legs adapted for connection to an alternating current source, a secondary winding on said intermediate leg and an auxiliary winding on the second of said outer legs, a condenser connected in series with said auxiliary winding to form a circuit connected across said secondary winding, connections for applying a load on said secondary winding, and variable impedance means connected to vary said load by a relatively small increment.

2. An electromagnetic trigger circuit comprising a ferromagnetic core having a pair of outer legs and an intermediate leg, a primary winding on one of said outer legs adapted for connection to an alternating current source, a secondary winding on said intermediate leg and an auxiliary winding on the second of said outer legs, a condenser connected in series with said auxiliary winding to form a circuit across said secondary circuit, a load circuit connected for supply by said secondary winding to establish a counterflux in said intermediate leg, and means independent of the load to be supplied by said load circuit for varying the flux in said intermediate leg by a relatively small increment.

3. An electromagnetic trigger circuit comprising a ferromagnetic core having a pair of outer legs and an intermediate leg, a primary winding on one of said outer legs adapted for connection to an alternating current source, a secondary winding on said intermediate leg and an auxiliary winding on the second of said outer legs, a condenser connected in series with said auxiliary winding to form a circuit connected across said secondary winding, a main load connected for supply by said secondary winding, and a control circuit connected in parallel with said main load.

4. An electromagnetic trigger circuit comprising a ferromagnetic core having a pair of outer legs and an intermediate leg, a primary winding on one of said outer legs adapted for connection to an alternating current source, a secondary winding on said intermediate leg and an auxiliary winding on the second of said outer legs, a condenser connected in series with said auxiliary winding to form a circuit connected across said secondary winding, connections for applying a main load connected for supply by said secondary winding, and a control circuit of relatively and variable high impedance in comparison with said load connected effectively in parallel therewith.

PHILIP J. WALSH.

REFERENCES CITED

The following references are of record in the file of this patent:

UNITED STATES PATENTS

| Number | Name | Date |
|---|---|---|
| 2,143,745 | Sola | Jan. 10, 1939 |
| 2,468,878 | Huge | May 5, 1949 |